United States Patent

Hubschmann

[15] 3,661,017
[45] May 9, 1972

[54] SEALING DEVICES FOR SHAFTS

[72] Inventor: Karl-Wolfgang Hubschmann, Langenweid, Germany

[73] Assignee: Motoren-Werke Mannheim AG Vorm, Benz Abt, Stationarer Motorenbau, Mannheim, Germany

[22] Filed: Sept. 17, 1970

[21] Appl. No.: 73,042

[30] Foreign Application Priority Data

Sept. 17, 1970 Germany..................P 19 46 965.9

[52] U.S. Cl............................................................74/18.1
[51] Int. Cl...........................................................F16j 15/50
[58] Field of Search....................74/18.1, 18, 17.8; 251/214, 251/335 A, 335 R

[56] References Cited

UNITED STATES PATENTS 429,611  6/1890  Facer........................................74/18 X

FOREIGN PATENTS OR APPLICATIONS 1,218,864  5/1960  France......................................74/18

Primary Examiner—William F. O'Dea
Assistant Examiner—F. D. Shoemaker
Attorney—Waters, Roditi, Schwartz & Nissen

[57] ABSTRACT

An oscillatory shaft extends through a wall of a stationary body. A flat, annular, elastomeric, sealing plate is sealingly fixed at its inner periphery to the wall and at its outer periphery to a collar on the shaft. The collar is encircled by the wall with an annular gap between them. At one face of the plate two intermediate elastomeric rings lie between the plate and the wall and between the plate and the collar, respectively. On a pressure difference occurring across the plate, the two rings are thereby deformed to close an annular space between them in the region of the gap, thereby supporting the plate against penetration into the gap.

5 Claims, 3 Drawing Figures

SEALING DEVICES FOR SHAFTS

BACKGROUND OF THE INVENTION

1. Field of the Invention

This invention relates to a device providing a seal between an oscillatory shaft and a stationary body.

2. Description of the Prior Art

A pressure-loaded device is known from Federal German Pat. DAS No. 1,078,388 for sealing an oscillatory shaft relatively to a stationary body. A yieldable sealing element connected both to the shaft and to the stationary body is supported, in opposition to the action of the pressure difference, by a stationary supporting element and a mobile supporting element, the stationary and mobile supporting elements defining an annular gap at the place where they meet.

The invention has as an object to obviate the disadvantage of this known sealing device, this disadvantage being that the yieldable sealing element is pressed into the gap between the stationary supporting element and the mobile supporting element when there is a considerable pressure difference, and becomes jammed in the gap, which causes damage to the sealing element and failure of the sealing devive.

SUMMARY OF THE INVENTION

According to the present invention, there is provided in combination, a stationary body, a shaft oscillatable about its axis relatively to said stationary body, yieldable sealing means connected in a substantially fluid-tight manner to said body and to said shaft, stationary supporting means supporting said sealing means at one side of said sealing means against a pressure difference across said sealing means, mobile supporting means movable with said shaft supporting said sealing means at said one side against said pressure difference, portions of said stationary supporting means and said mobile supporting means defining at said one side an annular gap therebetween encircling said axis, first intermediate elastomeric means disposed between said stationary supporting means and said sealing means at said one side, second intermediate elastomeric means disposed between said mobile supporting means and said sealing means at said one side, portions of said first intermediate elastomeric means and said second intermediate elastomeric means defining an annular discontinuity therebetween in the region of said annular gap and, when said pressure difference is present, lying closely adjacent to each other to support said sealing means against penetration into said gap.

This arrangement prevents penetration of the yieldable sealing means into the annular gap. The intermediate means are in fact pressed into the annular gap by the pressure which acts on the yieldable sealing means, but they are not subjected thereby to any substantial wear since they carry out hardly any movement relatively to the stationary and mobile supporting means. They carry out only a relative movement with respect to each other, but this does not result in any wear worth mentioning.

Advantageously, the intermediate means take the form of two layers of elastomeric material, the intermediate layers coming to abut on each other and supporting the yieldable sealing means in the aforesaid region at least when the sealing device is subjected to pressure.

It is particularly advantageous if the intermediate layers define at the place where they meet, when the pressure difference is absent, an annular gap which is of such a size that in the pressure-loaded state it is closed by the deformation of the intermediate layers.

Conveniently, the yieldable sealing means is in the form of a flat annular elastomeric plate which at its outer periphery is secured in a fluid-tight manner to the stationary body and at its inner periphery to the shaft, the stationary supporting means being a supporting wall fixed to the stationary body, the mobile supporting means being a collar fixed co-axially to the shaft, and the collar being closely encircled by the wall.

The deformation of the yieldable sealing plate occurring when the shaft oscillates is conveniently yieldable in that the inner periphery of the sealing plate and the associated intermediate layer are clamped against the shaft collar by means of an annular component of which the outer diameter is smaller than the means diameter of the annular gap.

BRIEF DESCRIPTION OF THE DRAWING

In order that the invention may be clearly understood and readily carried into effect, reference will now be made, by way of example, to the accompanying drawings, in which.

DESCRIPTION OF THE PREFERRED EMBODIMENT

Figure 1:
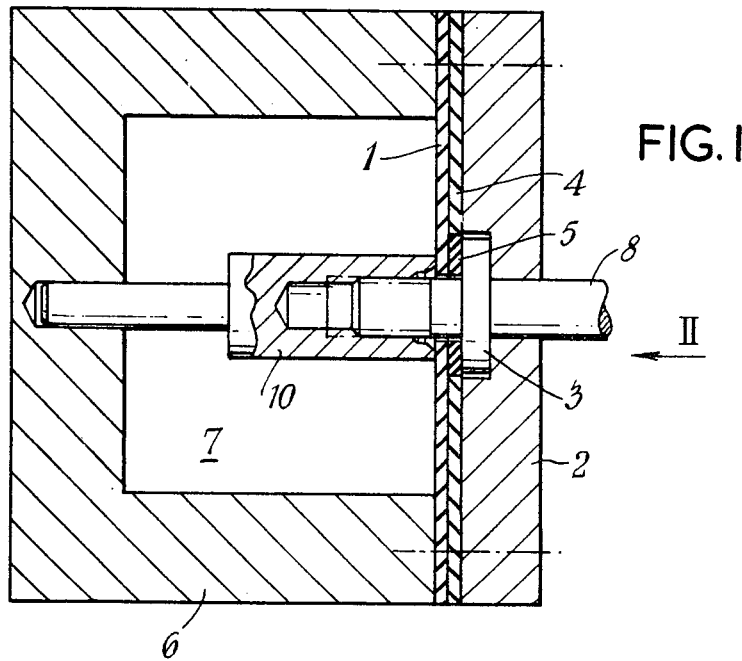
FIG. 1 shows a section through a device providing a seal between an oscillatory shaft and a stationary body, and taken along the line I—I of FIG. 2.
Figure 2:
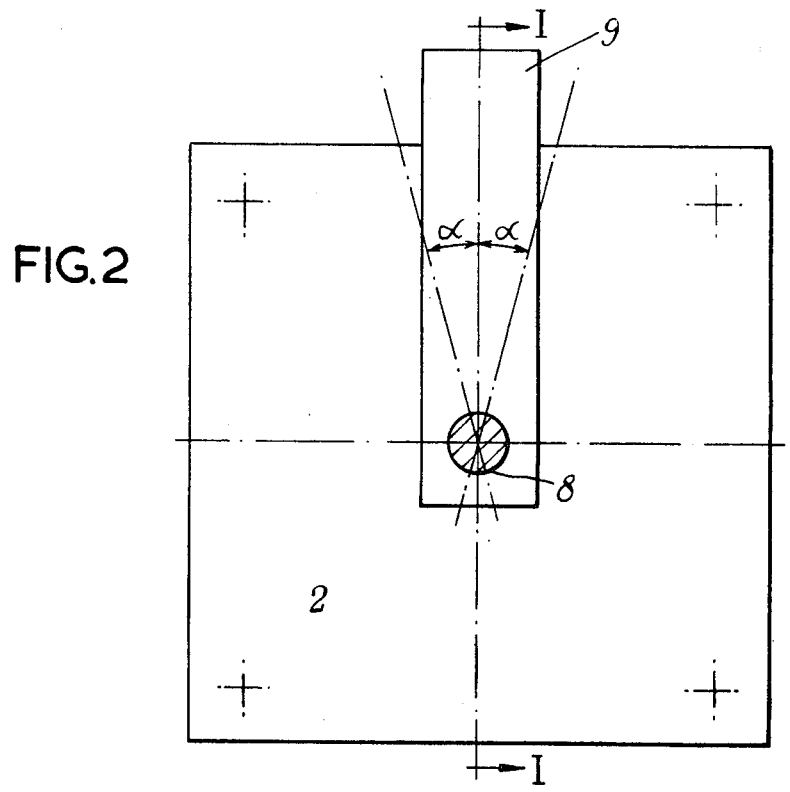
FIG. 2 shows an end elevation in the direction of the arrow II in FIG. 1.
Figure 3:
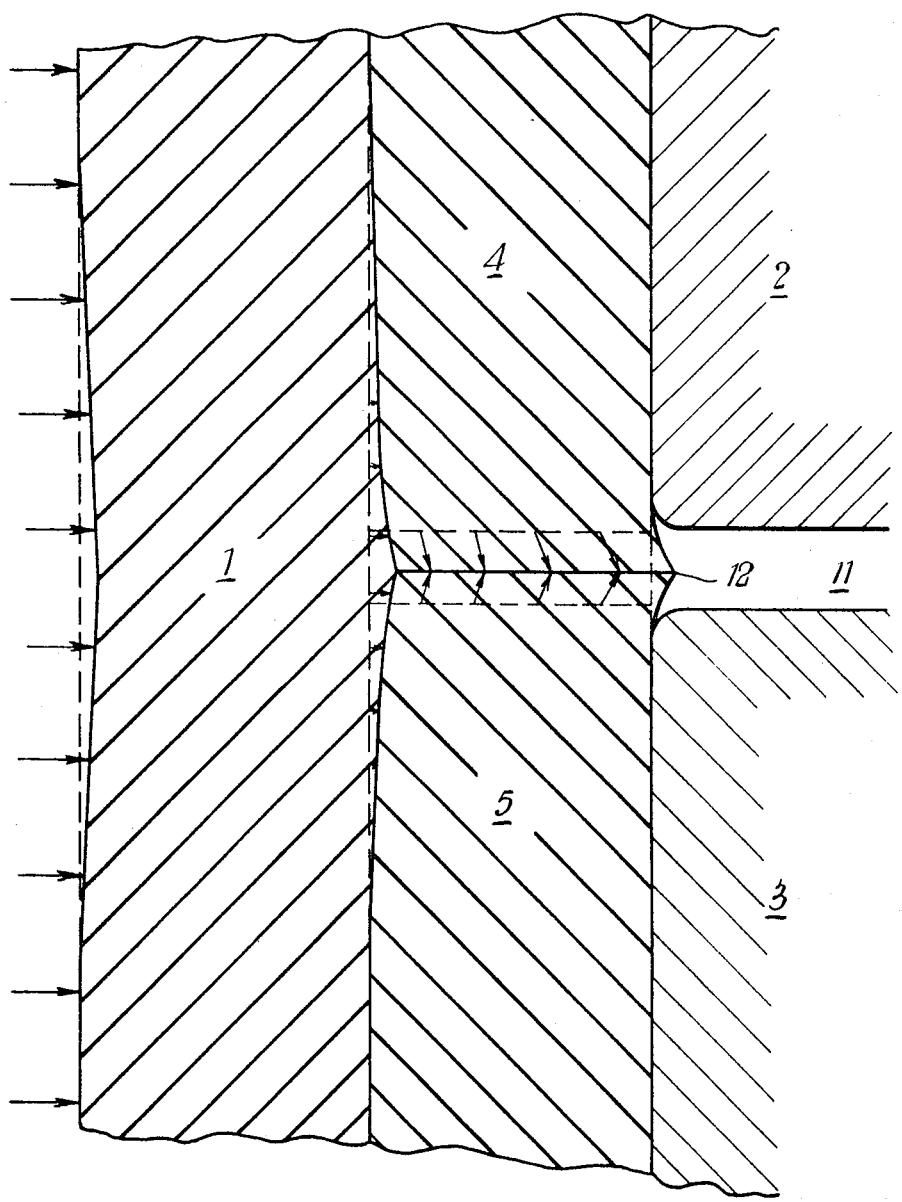
FIG. 3 shows a detail of FIG. 1.

Referring to the drawings, a yieldable sealing means 1 consists of a flat annular plate of elastomeric material. The plate 1 is supported by at least one stationary supporting means 2 and a mobile supporting means 3 through intermediate layers 4 and 5 which are in the form of flat rings and also consist of elastomeric material. The supporting means 2 is constructed as a supporting wall and serves for securing the plate 1 and the layer 4 at their outer peripheries in a fluid-tight manner on a stationary hollow body 6, the interior 7 of which is filled with a medium under pressure. The mobile supporting means 3 is formed by a collar of a shaft 8 to which a lever 9 (FIG. 2) is secured. The lever 9 can carry out an oscillatory movement as indicated by the angles $\alpha$. The inner periphery of the plate 1 and the layer 5 are clamped against the collar 3 by means of an annular nut 10 the outer diameter of which is less than the mean diameter of a gap 11. The supporting means 2 and 3 define the annular gap 11 therebetween, while the intermediate layers 4 and 5 define therebetween an annular discontinuity which is in the region of the gap 11 and forms in a sense a continuation thereof. FIG. 3 shows how the pressure (outline arrows) bearing on the plate 1 deforms (filled-in arrows) the plate 1 and also the intermediate layers 4 and 5, so that an annular gap which exists between the layers 4 and 5 when the pressure difference across the plate 1 is absent is closed, whereby the intermediate layers support the sealing plate against penetration into the gap 11.

I claim:

1. In combination, a stationary body, a shaft oscillatable about its axis relatively to said stationary body, yieldable sealing means connected in a substantially fluid-tight manner to said body and to said shaft, stationary supporting means supporting said sealing means at one side of said sealing means against a pressure difference across said sealing means, mobile supporting means movable with said shaft supporting said sealing means at said one side against said pressure difference, portions of said stationary supporting means and said mobile supporting means defining at said one side an annular gap therebetween encircling said axis, first intermediate elastomeric means disposed between said stationary supporting means and said sealing means at said one side, second intermediate elastomeric means disposed between said mobile supporting means and said sealing means at said one side, portions of said first intermediate elastomeric means and said second intermediate elastomeric means defining an annular discontinuity therebetween in the region of said annular gap and, when said pressure difference is present, lying closely adjacent to each other to support said sealing means against penetration into said gap.

2. A combination according to claim 1, wherein said portions of said first intermediate elastomeric means and said second intermediate elastomeric means abut each other when said pressure difference is present.

3. A combination according to claim 2, wherein said portions of said first intermediate elastomeric means and said second intermediate elastomeric means define an annular gap therebetween when said pressure difference is absent, and the establishment of said pressure difference produces deformation of the first and second intermediate elastomeric means to cause the aforesaid portions thereof to abut each other.

4. A combination according to claim 1, wherein said yieldable sealing means is a flat elastomeric annular plate which is secured at its inner peripheral zone in a substantially fluid-tight manner to said shaft and at its outer peripheral zone in a substantially fluid-tight manner to said stationary body, said stationary supporting means being an annular supporting wall fixed to said stationary body, and said mobile supporting means being an annular collar fixed co-axially to said shaft and encircled by said annular supporting wall.

5. A combination according to claim 4, and further comprising an annular component the outer diameter of which is smaller than the mean diameter of said annular gap and which clamps said inner peripheral zone against said collar.

* * * * *